United States Patent [19]
Hill

[11] Patent Number: 5,683,115
[45] Date of Patent: Nov. 4, 1997

[54] WEAK LINK FOR A SEISMIC STREAMER CABLE CONNECTOR MODULE

[75] Inventor: A C Hill, Navasota, Tex.

[73] Assignee: Teldyne Brown Engineering, Houston, Tex.

[21] Appl. No.: 654,233

[22] Filed: May 28, 1996

Related U.S. Application Data

[60] Provisional application No. 60/006,370, Nov. 08, 1995.
[51] Int. Cl.$^6$ ................................................ F16L 35/00
[52] U.S. Cl. .................................................. 285/2; 285/276
[58] Field of Search ................................ 285/2, 3, 4, 276

[56] References Cited

U.S. PATENT DOCUMENTS

| | | | |
|---|---|---|---|
| 3,499,664 | 3/1970 | Burns | 285/2 |
| 3,502,353 | 3/1970 | Burns | 285/2 |
| 3,786,410 | 1/1974 | Hazelhurst | 340/17 |
| 3,987,537 | 10/1976 | Warren | 29/592 |
| 4,064,953 | 12/1977 | Collins | 285/2 X |
| 4,967,400 | 10/1990 | Woods | 367/21 |

FOREIGN PATENT DOCUMENTS 307101  3/1929  United Kingdom ................ 285/3

Primary Examiner—Dave W. Arola
Attorney, Agent, or Firm—William A. Knox

[57] ABSTRACT

The rotatable cylindrical sleeve that comprises the female cable connector termination of a seismic streamer cable section is made in two telescoping parts. The two telescoping parts are indexed together by a shear pin to form a weak link assembly. If a streamer cable is snagged, the shear pin fails, allowing the telescoping parts of the sleeve to part company, releasing the snagged cable portions but without structural damage to the cable section. A feature of the device is its ease of retrofit.

1 Claim, 2 Drawing Sheets

WEAK LINK FOR A SEISMIC STREAMER CABLE CONNECTOR MODULE

BACKGROUND OF THE INVENTION

1. Relation to Other Applications

This application is a Regularly filed Patent Application having priority from the filing data of Provisional patent application Ser. No. 60/006,370, filed Nov. 8, 1995 in the name of A C Hill, entitled WEAK LINK FOR A SEISMIC STREAMER CABLE CONNECTOR MODULE.

2. Discussion of Related Art

Marine seismic streamer cables consist of 25–50 separate sections, each about 50 to 100 meters long. A cable section consists of an outer plastic hose-like jacket, often up to three inches in diameter but sometimes smaller in order to reduce overall weight and to reduce towing forces. The jacket contains a plurality of seismic sensors, signal transmission lines, power lines, stress members, and a filling of a light-weight fluid to provide neutral buoyancy. The respective cable sections usually are mechanically and electrically (or optically) interconnected by means of connector modules that contain electronics for partially processing the signals from the seismic sensors and for transmitting the partially processed signals to the towing ship for additional processing and archival storage.

There are a plethora of patents describing various aspects of seismic streamer cable design. U.S. Pat. No. 4,967,400 presents an overview of available literature on streamer cables which patent is incorporated herein by reference and to which the student of streamer-cable design is referred. In particular, FIG. 19 of the patent illustrates a typical cable connector module.

Seismic streamer cable sections are interconnected with the cable connector modules by means of a cable termination fitting at each end of a cable section. The leading end of a cable section or a connector module usually has a rotatable threaded female member that mates with a threaded male member at the trailing end of an adjacent connector module or section. For good and sufficient reasons, regardless of the diameter of the jacket of a streamer cable section, the cable connector modules are furnished to the Industry in a single standard size that happens to require use of cable termination fittings sized for a three-inch cable-section jacket.

A cable harness includes the equipment that must be stuffed inside the cable jacket including: Seismic sensors, stress member, supporting bulkheads, electrical and/or optical signal transmission lines, as well as the cable end terminations. Customarily the harness is pushed through the jacket by creating an hydraulic or pneumatic pressure differential across the opposite ends of the plastic jacket. The process is described, for example, in U.S. Pat. No. 3,987,537, issued Oct. 26, 1976 to N. M. Warren and assigned to a predecessor firm of the assignee of this invention and which is incorporated herein by reference.

The cable-stuffer of the '537 patent assumes that the outside diameter of the cable end terminations are small enough to pass through the jacket. But that is not possible if a sub-diameter cable jacket is to be used with a standard-diameter connector module. An adapter assembly is required to render a sub-diameter jacket to be compatible with a standard sized connector module.

As earlier explained, the streamer cable, which may be two or three miles long, during tow in the water may encounter underwater obstructions. It may be snagged by shrimp-fishers' nets, rival exploration ships, offshore oil rigs or the like. Streamer cables typically cost on the order of mega-dollars. If the streamer cable is snagged, the ship cannot immediately stop so that the streamer cable is likely to be rent asunder. Such an accident results in nearly complete loss of the structural integrity of one or more of the expensive sections. To avoid such catastrophic losses, it is desirable to provide a weak link arrangement such that the weak link will give way but leave the snagged cable section structurally intact for later recovery.

One such weak link for use with a towed seismic cable is taught in U.S. Pat. No. 3,786,410, issued Jan. 15, 1974 to G. D. Hazelhurst. However, that device is designed for use with land cables and is not suitable for use in a marine environment.

Among other desiderata, there is a need for a weak link specifically designed for use with a marine seismic streamer cable and in particular, a unit designed to be capable of a convenient retrofit to commercially-available streamer cables and connector modules without doing violence to existing design.

SUMMARY OF THE INVENTION

A retrofittable weak link assembly is built into the female cable termination fitting of a connector module. The female cable termination fitting of this invention includes five components: (a) A hollow cylindrical fixed member, having an end projection, secured to an end of a cable connector module; (b) a rotatable cylindrical outer sleeve member, a first end of which is internally threaded; (c) a cylindrical inner sleeve member that telescopes snugly into a second end of the outer sleeve member, the inner sleeve member including a bore for receiving therein the end projection of the fixed member; (d) a threaded shear pin for indexing the rotation of the inner sleeve member in unison with the rotation of the outer sleeve member, the shear plane of the shear pin coinciding with the interface between the inner and outer sleeve members; (e) ball bearing means for rotatably securing the indexed outer and inner sleeve members to the end projection of the fixed member.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
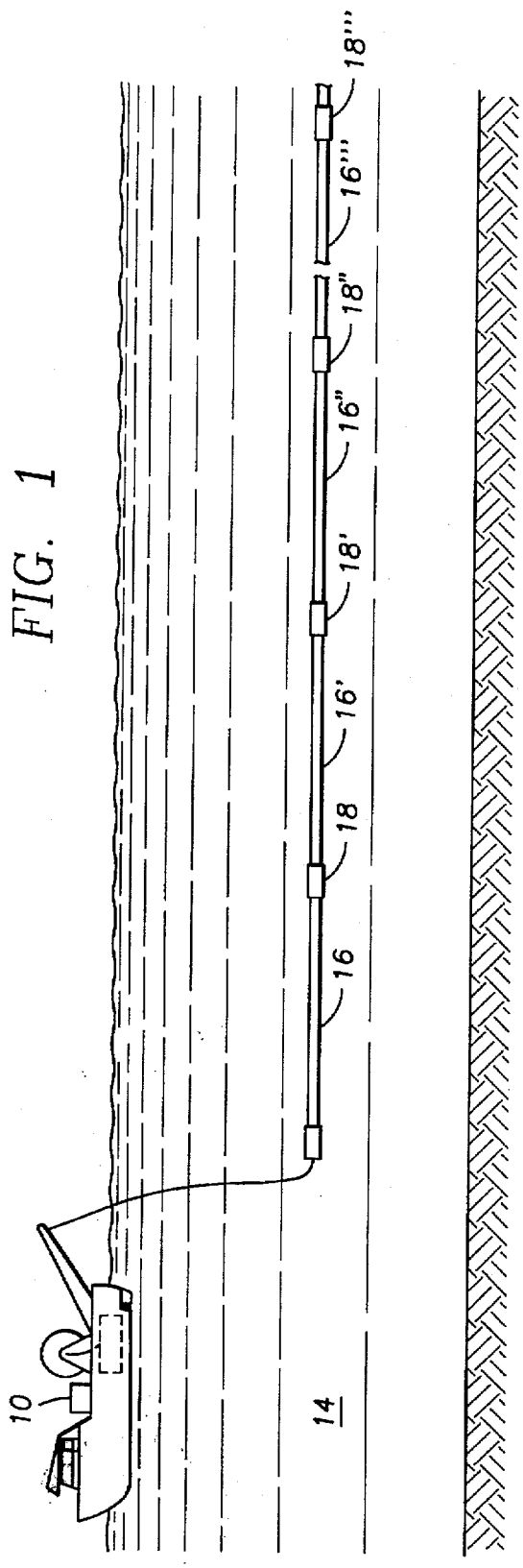
FIG. 1 shows a ship towing a seismic streamer cable through a body of water.

FIG. 1 shows a ship 10 towing a seismic streamer cable 12 through a body of water 14, Streamer cable 12 consists of a plurality of sections 16, 16', 16", 16''' that are coupled together by cable connector modules 18, 18', 18", 18'''. Four such cable sections and four connector modules are shown but many more may be used in practice. For purposes of this disclosure, the respective cable sections 16' are symbolically shown to be sub-diameter relative to standard-sized connector modules 18'.

Figure 2:
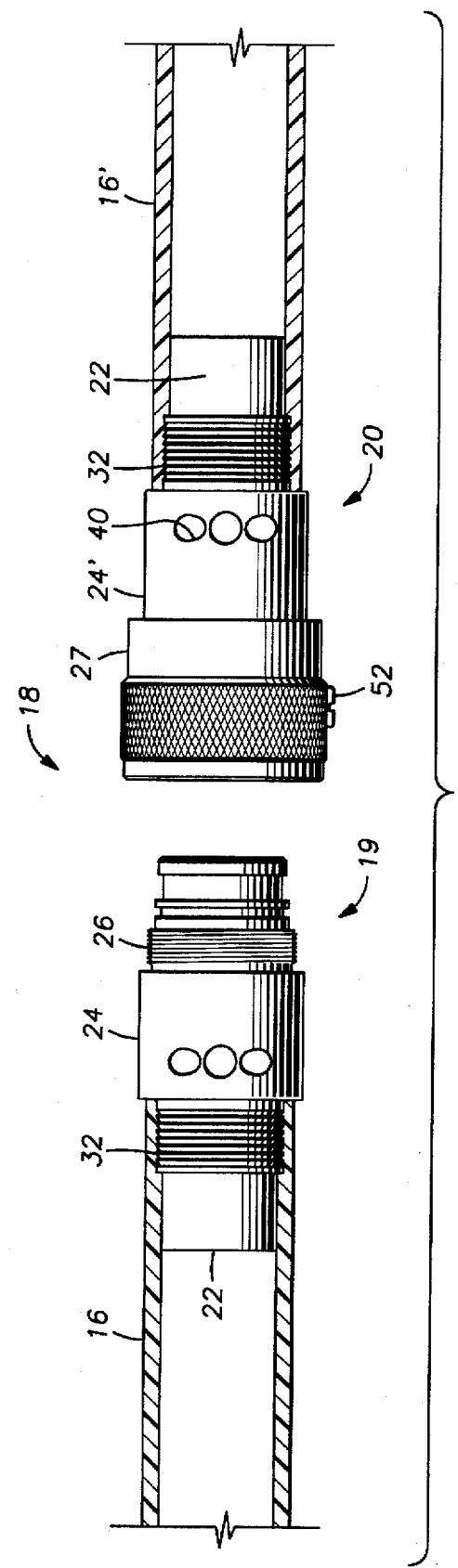
FIG. 2 is a side view of the cable connector adapter as fitted to male and female connector housings of cable end termination fittings.
Figure 3:
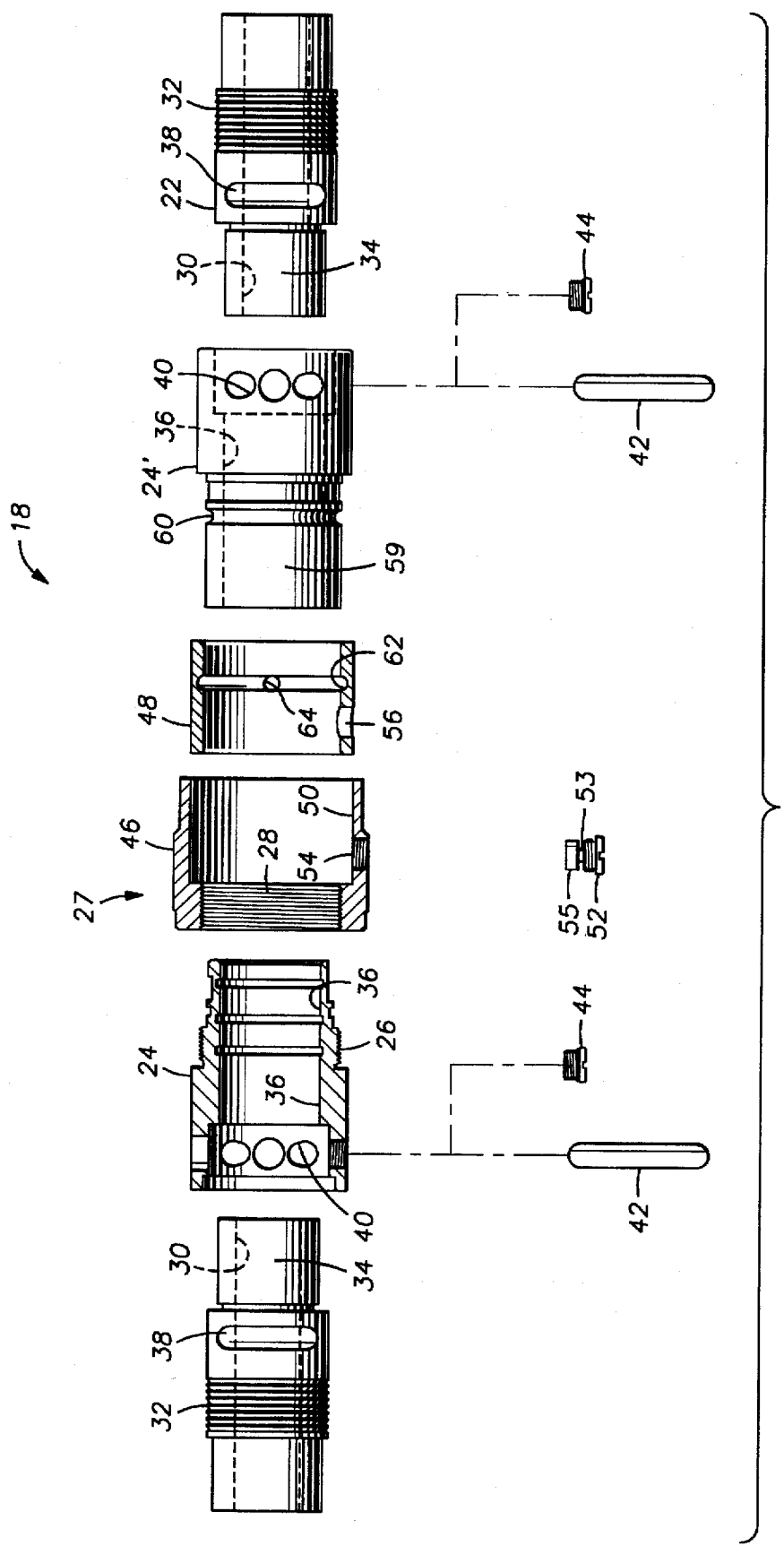
FIG. 3 is an exploded view of the cable connector adapter including the weak link assembly.

Refer now to FIGS. 2 and 3. FIG. 2 is an overall side view of a typical male and female cable connector adapter assemblies 19 and 20 respectively which form the end termination fittings of a cable section, as fitted into the trailing end of section 16 and into the leading end of cable section 16'. The arrangement could be reversed, of course. Regardless of gender, the cable connector adapter assembly is comprised essentially of two members: a cylindrical cable-section end termination 22 and a threaded cylindrical connector housing 24. The male connector housing includes an externally threaded portion 26. The female connector housing 24 includes a cylindrical, rotatable member 27 that has an internally threaded portion 28 (shown in cross section in FIG. 3) to engage the threads 26 of the male connector housing of an adjacent cable section such as 16 or a standard connector module such as 18.

With reference to FIGS. 2 and 3, a cable-section end termination such as 22 is characterized by an outer diameter that is commensurate with the inner diameter of the of the desired-sized jacket 17, of section 16. A first portion of the outer surface of the end termination is serrated as at 32 for firmly gripping the cable section jacket 17. An external band (not shown) may be wrapped around the outside of the jacket for additional security. A second portion of the outer surface of the cable-section end termination 22 comprises a smooth shank 34. End termination 22 also defines a bore 30, through which selected portions of a harness may be passed in accordance with well-known manufacturing methods but which harness is not shown to avoid complicating the drawings because it is not germane to this invention.

The second member of the cable connector adapter assembly is a cylindrical threaded connector housing of appropriate gender. The second member includes a bore, 36, therethrough for snugly receiving the smooth shank portion of end termination 22. The term snugly is here used in the ordinary dictionary meaning of the word.

An end termination such as 22 is provided with a semi-cylindrical slot 38 aligned orthogonally to the longitudinal axis of the fitting 22. A bore, 40, is drilled across a chord of the wall of the connector housing 24 orthogonally to the longitudinal axis thereof. When slot 38 in end termination 22 is aligned with bore 40 in connector housing 24, an anchor pin 42 is inserted through bore 40 and releasably locked in place by a set screw 44. Preferably two such anchor pins are used, one on each side of the connector housing, the second pin being hidden from view in the Figures.

A weak link assembly is constructed as an integral part of the rotatable portion 27 of a female connector housing of a cable termination fitting and is designed as follows. The female connector housing 27 consists of a rotatable cylindrical outer sleeve member 46 and a cylindrical inner sleeve 48 which telescopes into a bore 50 in outer sleeve 46. One end of outer sleeve member 46 is internally threaded as before stated. The two sleeves 46 and 48 are constrained to rotate together, indexed by a threaded shear pin 52 which has a reduced-diameter portion or shear plane 53 and a base portion 55.

In use, inner sleeve 48 is fitted into outer sleeve 46 which has a threaded orifice 54. Orifice 54 in outer sleeve 46 aligned with a detent 56 in inner sleeve 48. When shear pin 52 is screwed in place, base 55 of shear pin 52 engages detent 56 to lock the two members together thereby to index the rotation of the inner sleeve member 48 in unison with the rotation of the outer sleeve member 46. Shear pin 52 is calibrated to withstand a preselected tension such as 4000 pounds before failure. Shear pin 52 is designed such that the shear plane, that is, the reduced-diameter portion 53 coincides with the interface between inner and outer sleeve members 46 and 48 so that after the pin shears, inner sleeve 48 will cleanly separate from outer sleeve 46, leaving the cable section itself intact without structural damage.

The cable termination fitting further includes a hollow cylindrical fixed member 24 that has an end projection 59 that fits into a bore 61 of inner sleeve member 48. An external ball race 60 is cut around the perimeter of fixed member 24. Internal sleeve member includes a corresponding internal ball race 62. During assembly, ball race 62 in member 48 is aligned with ball race 60 in member 24. A plurality, such as 27, of ball bearings (not shown), 0.25 inch in size by way of example but not by way of limitation, are poured into the aligned races through a ball entry port 64 in sleeve member 48. When the race is full, inner sleeve member 48 is inserted into outer sleeve member 46 and is locked in place by shear pin 52. The outer sleeve member 46 covers the ball entry port 64 and inherently seals the ball bearings in place, thus avoiding the need for the complication of a separate external ball-sealing means as was formerly required by the female fittings of the prior art. The ball bearings provide a means for retrofitting the indexed outer and inner sleeve members of the weak link assembly to the end projection 59 of fixed member 24.

The weak link assembly can be easily retrofitted to existing cable termination fittings of a connector module such by simply emptying the ball bearings from the old female fitting through the exterior ball-entry port. The weak link assembly replaces the original rotatable member 27 and the ball bearings are reinserted as above explained.

In operation, it is contemplated that the shear-strength of the shear pins may be tapered along the length of the seismic streamer cable if desired. That is, the shear strength of pins installed in termination fittings between cable sections close to the towing ship might be substantially greater than the shear strength of pins in cable termination fittings near the trailing end of the streamer cable where the towing forces are smaller.

For purposes of this disclosure, the weak link assembly may be installed directly on the individual cable sections orifice 54 or it may be installed on instrumented connector modules or both. Therefore, for brevity, the single term "cable connector module" is intended to include all such applications.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A weak link assembly for a seismic streamer cable connector module, comprising:

a hollow cylindrical fixed member, having an end projection, secured to one end of a connector module;

a rotatable outer sleeve member, a first portion of which is internally threaded, a second portion of which is characterized by a bore having a preselected diameter;

a cylindrical inner sleeve member sized to telescope snugly into the bore of said rotatable outer sleeve member, the cylindrical inner sleeve member having a bore for receiving therein the end projection of said hollow cylindrical fixed member;

a threaded shear pin having a preselected shear strength for engaging the inner and outer sleeve members so as to index the rotation of the inner sleeve member in unison with the rotation of the outer sleeve member, the shear plane of the shear pin being coincident with the interface between the inner and outer sleeve members; and ball bearing means for rotatably securing the indexed inner and outer sleeve members to the end projection of the fixed member.

* * * * *